US008683001B2

(12) United States Patent
Maki et al.

(10) Patent No.: US 8,683,001 B2
(45) Date of Patent: *Mar. 25, 2014

(54) ADDRESS MANAGEMENT DEVICE

(75) Inventors: Nobuhiro Maki, Sagamihara (JP);
Naoko Iwami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 679 days.

This patent is subject to a terminal disclaimer.

(21) Appl. No.: 12/835,939

(22) Filed: Jul. 14, 2010

(65) Prior Publication Data

US 2010/0281226 A1    Nov. 4, 2010

Related U.S. Application Data

(63) Continuation of application No. 11/433,117, filed on May 12, 2006, now Pat. No. 7,779,082, which is a continuation of application No. 10/690,055, filed on Oct. 20, 2003, now Pat. No. 7,159,045.

(30) Foreign Application Priority Data

Jul. 2, 2003    (JP) ................................. 2003-189956

(51) Int. Cl.
*G06F 15/167*    (2006.01)
(52) U.S. Cl.
USPC ........... 709/212; 711/147; 711/202; 711/203; 711/206; 711/210; 709/200; 709/220
(58) Field of Classification Search
USPC .......... 709/212, 200, 220; 711/147, 202, 203, 711/206, 210
See application file for complete search history.

(56) References Cited

U.S. PATENT DOCUMENTS

| 5,437,033 | A | | 7/1995 | Inoue et al. |
| 5,555,414 | A | | 9/1996 | Hough et al. |
| 5,848,231 | A | * | 12/1998 | Teitelbaum et al. ............... 726/4 |
| 6,108,760 | A | * | 8/2000 | Mirsky et al. .................. 711/203 |
| 6,260,120 | B1 | * | 7/2001 | Blumenau et al. ............ 711/152 |
| 6,647,387 | B1 | | 11/2003 | McKean et al. |
| 2003/0002492 | A1 | | 1/2003 | Gallagher et al. |
| 2003/0149763 | A1 | | 8/2003 | Heitman et al. |
| 2003/0172149 | A1 | | 9/2003 | Edsall et al. |
| 2004/0085955 | A1 | | 5/2004 | Walter et al. |
| 2004/0098537 | A1 | | 5/2004 | Serizawa |
| 2004/0103261 | A1 | | 5/2004 | Honda et al. |

(Continued)

OTHER PUBLICATIONS

"IBM Total Storage SAN Switch: Using the 2109 Model M12," pp. 59-63, IBM Corporation White Plains, New York (Jan. 2003).

*Primary Examiner* — Anthony Mejia
(74) *Attorney, Agent, or Firm* — Kilparick Townsend & Stockton LLP

(57) ABSTRACT

Conventionally, when a switch virtualizing a storage (storage virtualization switch) is installed in a computer system including an SAN, a host computer, and a storage device, since a port ID of a virtual storage and a port ID of a storage device assigned to the virtual storage are different, the computer system has to be suspended at the time of installation of the storage virtualization switch. The storage virtualization switch installed in the computer system assigns a port ID to a port of a virtual storage generated by the storage virtualization switch so as to be equivalent to a port ID of an existing storage device and, in the case in which the port ID is designated as an access destination by an access request from one computer to the storage device, sends the access request to the virtual storage.

9 Claims, 9 Drawing Sheets

(56) References Cited

U.S. PATENT DOCUMENTS

| | | | |
|---|---|---|---|
| 2004/0123327 A1* | 6/2004 | Fai Ma et al. | ................. 725/100 |
| 2004/0143832 A1 | 7/2004 | Yamamoto et al. | |
| 2004/0148380 A1 | 7/2004 | Meyer et al. | |
| 2004/0151188 A1* | 8/2004 | Maveli et al. | ................. 370/398 |
| 2004/0193677 A1 | 9/2004 | Dar et al. | |

* cited by examiner

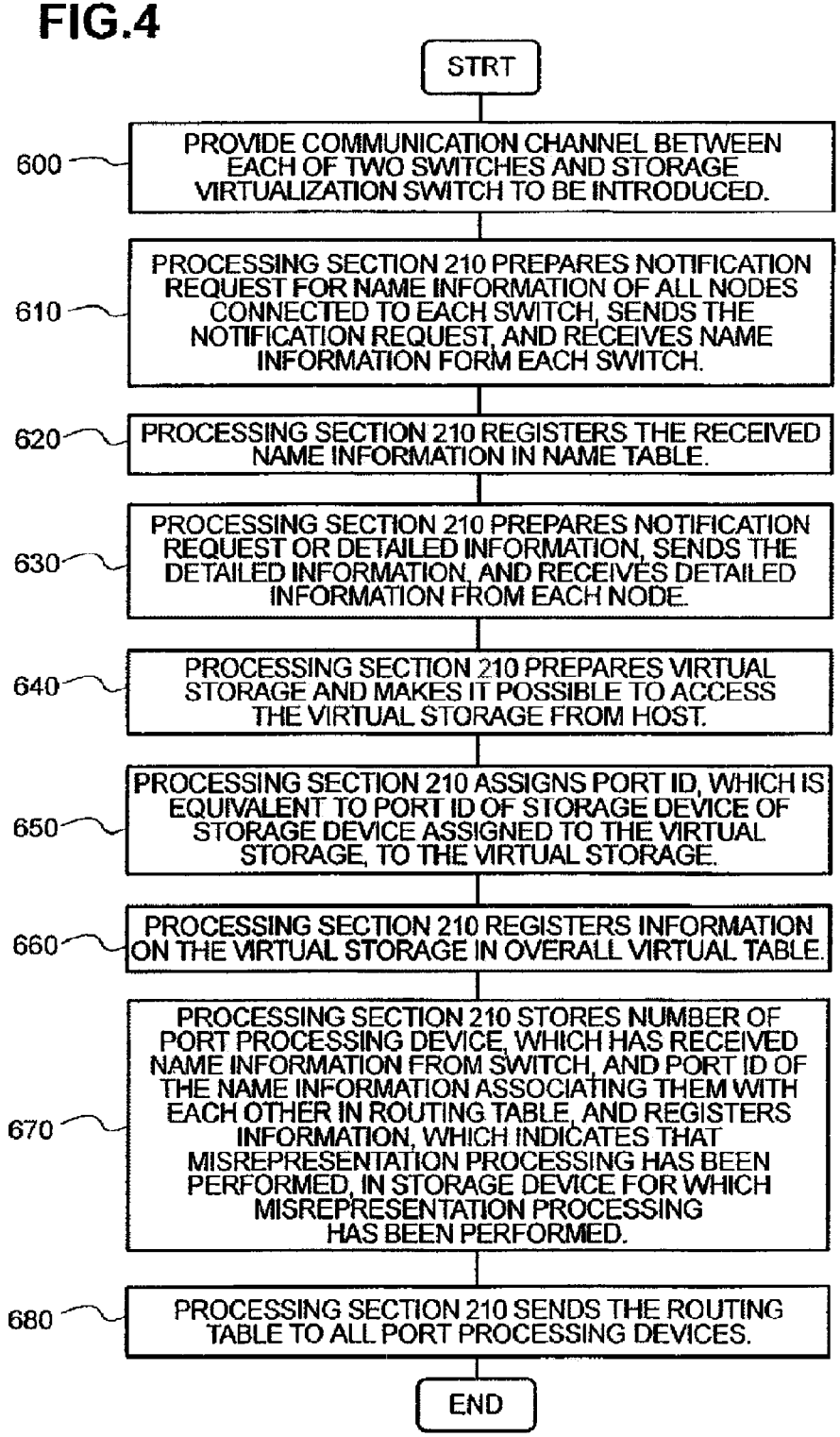

FIG.5

| PORT ID | PORT WWN | NODE WWN | PORT ATTRIBUTE | MISREPRE-SENTATION | VIRTUAL INFORMATION | DETAILED INFORMATION | |
|---|---|---|---|---|---|---|---|
| Pa | Wa | Na | Aa | | | Host | 5A |
| Pb | Wb | Nb | Ab | Yes | VT | Virtual Storage | 5B |
| Pb | Wc | Nc | Ac | Yes | VIRTUAL ASSIGNMENT | Storage | 5C |
| Pd | Wd | Nd | Ad | | | Host | 5D |
| Pe | We | Ne | Ae | | VI | Virtual Host | 5E |
| Pf | Wf | Nf | Af | | | Storage | 5F |

| PORT ID | PORT PROCESSING DEVICE NUMBER | MISREPRESENTATION B | VIRTUAL INFORMATION |
|---|---|---|---|
| Pa | Ma | | |
| Pb | Ma | | VT |
| Pb | Mb | Yes | VIRTUAL ASSIGNMENT |
| Pd | Ma | | |
| Pe | Mb | | VI |
| Pf | Mb | | |

ADDRESS MANAGEMENT DEVICE

CROSS-REFERENCES TO RELATED APPLICATION

This application is a continuation application of U.S. patent application Ser. No. 11/433,117, filed on May 12, 2006, which claims priority from U.S. patent application Ser. No. 10/690,055, filed on Oct. 20, 2003 (now U.S. Pat. No. 7,159,045), which in turn claims priority to Japanese Patent Application JP2003-189956, filed on Jul. 2, 2003, the contents of all of which are incorporated in their entirety for all purposes.

BACKGROUND OF THE INVENTION

1. Field of the Invention

The present invention relates to a computer system in which a computer, a storage device, and a switch are connected to a network, and in particular to a switch for virtualizing a storage (virtualized storage is hereinafter referred to as virtual storage) while keeping the computer system operating (hereinafter referred to as storage virtualization switch).

2. Description of the Related Art

Recently, in accordance with increase in an amount of data, a Storage Area Network (SAN) which is a technique for connecting a computer and plural storage devices by a network (switch) has been used. According to this SAN technique, it becomes possible to cope with sudden increase in the amount of data by connecting the storage devices to the switch at any time. However, as the number of storage devices in a computer system increases, since ports for the switch connecting the computer and the storage devices becomes insufficient, addition of switches is required.

In the related art, installation of a switch in an existing computer system is realized by connecting one of free ports of a switch in the system and one port of the switch to be added with a network (see "IBM Total Storage SAN Switch: Using the 2109 Model M12", [online], [retrieved on Jan. 10, 2003], pages 59 to 63). According to the above-mentioned technique, it is possible to install the switch while keeping the system operating.

SUMMARY OF THE INVENTION

On the other hand, in the SAN, although a host can directly access the plural storage devices, since the host is required to be conscious of respective physical storage devices, storage areas which the host can use at a time are limited to a capacity within the respective storage devices. In order to solve such problems, installation of a storage virtualization switch for showing the plural storage devices as if they are one logical storage device for the host is in progress. With this technique, it becomes possible to provide the host with a virtual storage which provides a virtual storage configuration which does not depend upon a physical storage configuration. However, it is not considered to install this storage virtualization switch in the computer system while keeping the system operating. The storage virtualization switch cannot be installed in the computer system while keeping the system operating due to the following reasons. That is since a virtual storage generated by the storage virtualization switch has a different port ID (address assigned to a port) and a port name, also called a World Wide Name ("WWN"), which are completely different from those of a storage device, the virtual storage is recognized as a separate storage device on the host. In this case, it is necessary to stop operation of an application, which uses a storage device before it is assigned to the virtual storage on the host, and change setting.

It is an object of the present invention to provide a storage virtualization switch which, when it is installed in an existing computer system and an existing storage device is assigned as a virtual storage, makes it possible to access the virtual storage using a port ID of the storage device, which a computer uses in accessing the existing storage, without change.

In order to attained the object of the present invention, the storage virtualization switch to be installed in the computer system assigns a port ID to a port of a virtual storage generated by the storage virtualization switch such that the port ID is equivalent to a port ID of the existing storage device and, in the case in which the port ID is designated as an access destination in an access request from one computer to the storage device, the access request is sent to the virtual storage.

BRIEF DESCRIPTION OF THE DRAWINGS

FIG. 4 is a diagram showing a processing flow of procedures for installing the storage virtualization switch;

FIG. 5 is a diagram showing a name table which is used in a name service;

FIG. 7 is a diagram showing a routing table which is used in routing;

DESCRIPTION OF THE PREFERRED EMBODIMENTS

Embodiments of the present invention will be described with reference to FIG. 1. In the figure, programs and information stored in memories are encircles. In addition, symbols such as Pa and Ma in the figure are associated with FIGS. 4 and 6.

Figure 1:
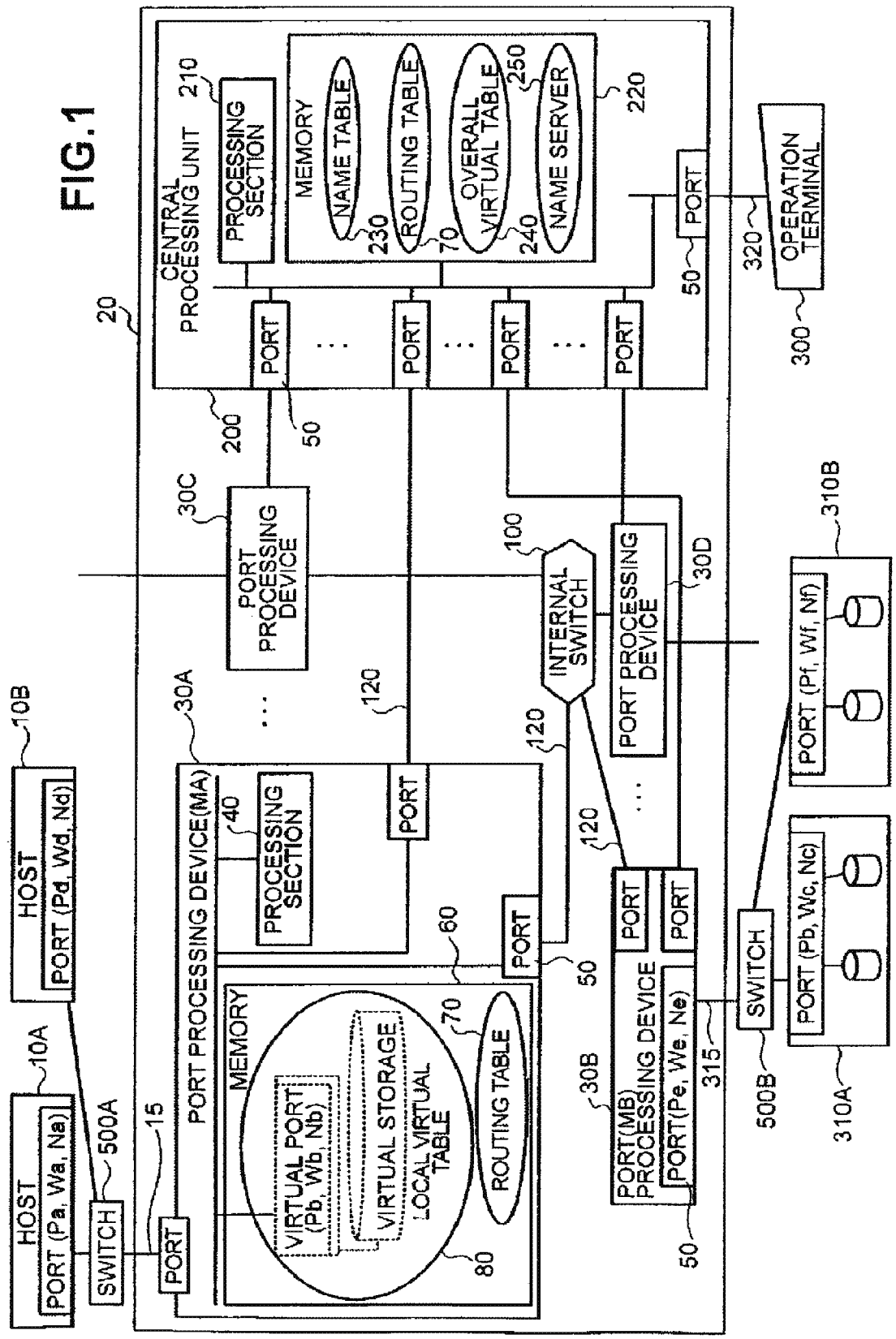
FIG. 1 is a diagram showing a computer system provided with a storage virtualization switch.

FIG. 1 shows an example of a computer system in the present invention. The computer system includes plural hosts 10 (10A, 10B), plural switches 500 (500A, 500B), a storage virtualization switch 20, one or plural storage devices 310 (310A, 310B), and an operation terminal 300. Here, the storage device is assumed to be a device including plural memory devices and a memory control device for controlling the memory devices. The hosts 10 and the storage virtualization switch 20 are connected via a communication channel 15, the storage virtualization switch 20 and one or plural storage devices 310 are connected via a communication channel 315, and the operation terminal 300 and the storage virtualization switch 20 are connected via a communication channel 320. Internal paths 120 only have to be a communication channel which can transfer data such as a fibre channel or the Ethernet.

The storage virtualization switch 20 has port processing devices 30 (30A, 30B, 30C, and 30D), an internal switch 100 which switches a route of data among the port processing devices, and a central control unit 200.

The port processing devices 30 have ports 50 which are connected to the hosts 10, the storage devices 310, and the internal switch 100 to send and receive data, a processing section 40 which applies virtual processing or the like to received data, and a memory 60 which stores a routing table 70 and a local virtual table 80 which are described later. These are connected by a communication channel such as an internal bus.

The central control unit 200 has a memory 220 for storing a name server 250, an overall virtual table 240 (FIG. 9), the routing table 70 (FIG. 7), and a name table 230 (FIG. 5), which are described later, and a processing section 210 which controls the entire storage virtualization switch 20. These are connected by a communication channel such as an internal bus. Here, the name server means a program for managing name information of nodes in the SAN. More specifically, the name server has a section for storing the name information in a memory according to a request from the hosts or the storage devices and assigns an ID to the name information and a section for coping with an inquiry request for an ID from a WWN of a storage by one host.

Although not illustrated, the hosts 10 have a processor, a main memory, and the like, which are connected by a communication channel such as an internal bus. Note that, here, the nodes indicate the hosts 10 or the storage devices 310.

FIG. 5 is a diagram showing an example of the name table 230. The table includes port IDs which are allocated by the switch at the time of connection, port WWNs which are permanently provided in the nodes, node WWNs which are WWNs of the nodes themselves, port attributes indicating information such as a type of a port or a type of a communication protocol (these four pieces of information are hereinafter referred to as name information), misrepresentation A3040 indicating whether or not a storage device is a storage related to misrepresentation processing described later, virtual information 3050 indicating attributes of virtual processing, and detailed information 3060 indicating detailed information of the nodes. This format itself is defined in an FCP (protocol for a fibre channel).

FIG. 7 is a diagram showing an example of the routing table 70 for determining a route in data communication among the plural port processing devices 30. The routing table includes port IDs, port processing device numbers indicating addresses of the port processing devices, misrepresentation B for performing routing described later, and virtual information. Note that rows in FIGS. 5 and 7 correspond with each other.

The switches 500A and 500B which are connected to the storage virtualization switch 20 have the same structure as the storage virtualization switch 20 except that the switches 500A and 500B do not have a virtualization function. The switches 500A and 500B manage the name information shown in FIG. 5.

1. Procedures for Installing a Storage Virtualization Switch

First, procedures for installing the storage virtualization switch 20 in an existing SAN while keeping the system operating and for assigning a storage device in the system as a virtual storage to start virtual processing will be described with reference to FIGS. 1 to 5. Here, the virtual processing means processing for providing a virtual volume, which has a quantity, a volume, and a function designated by an administrator or the like of the computer system in advance, to the hosts 10. In addition, in the present invention, the virtual storage indicates a component having a virtual port and a virtual volume. The virtual port has a virtual port ID and a virtual port WWN.

Figure 2:
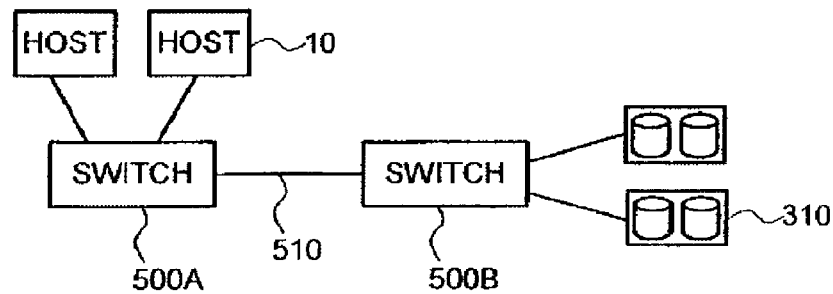
FIG. 2 is a diagram showing an example of a structure of a computer system to which the present invention can be applied.

In order to install the storage virtualization switch 20 while keeping the system operating and start the virtual processing, it is necessary to have at least two switches 500 in the computer system and the switches are connected by the communication channel 510 (in a form of linkup) as shown in FIG. 2 as a premise.

FIG. 4 shows a processing flow of procedures for installing the storage virtualization switch.

Figure 3A:
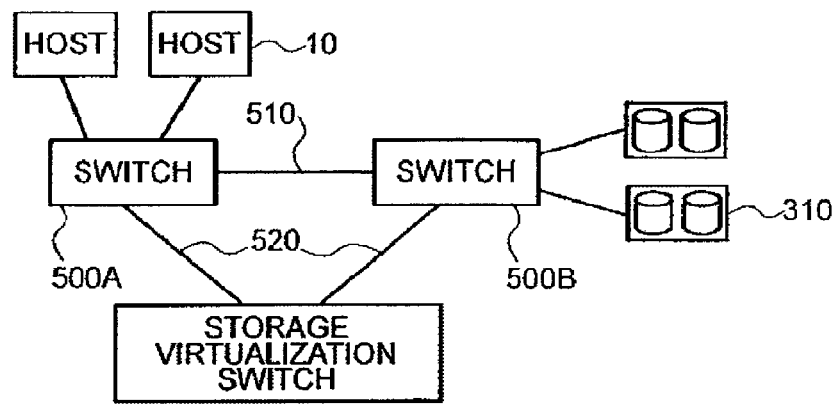
FIGS. 3A and 3B are diagrams showing examples of a structure of the computer system after installing the storage virtualization switch.
Figure 3B:
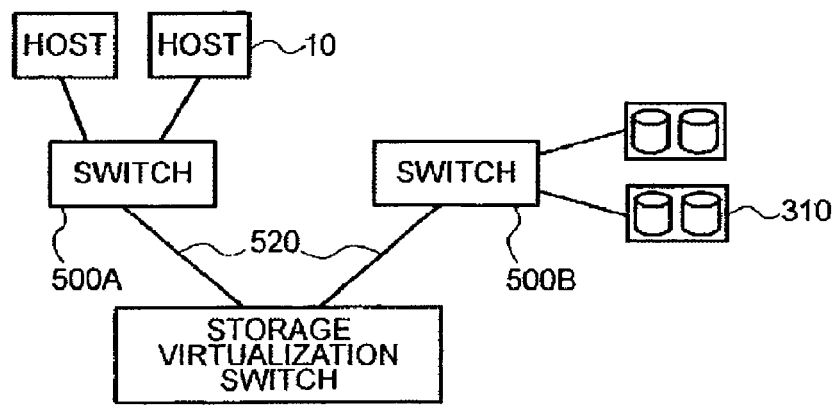

First, as shown in FIG. 3A, a communication channel 520 is provided between each of the two switches 500 and the storage virtualization switch to be installed (step 600). In the storage virtualization switch, the processing section 210 of the central control unit 200 prepares a notification request for name information of all nodes connected to each switch 500 and sends the request to the two switches 500 via the port processing devices 30. Each switch notifies the storage virtualization switch of the name information by executing the name server, and the processing section 210 of the storage virtualization switch 20 receives the name information (step 610).

The processing section 210 registers the name information received from each switch in the name table 230 (FIG. 5) (step 620). For example, it is assumed that the storage virtualization switch 20 has received name information of the hosts 10A and 10B from the switch 500A. In that case, the processing section 210 registers a port ID "Pa", a port WWN "Wa", a node "Na", and a port attribute "Aa", respectively, for the host 10A in an entry 5A of FIG. 5 and registers a port ID "Pd", a port WWN "Wd", a node "Nd", and a port attribute "Ad", respectively, for the host 10B in an entry 5D of FIG. 5. Similarly, if the processing section 210 receives name information of the storage devices 310A and 310B from the switch 500B, the processing section 210 registers a port ID "Pb", a port WWN "Wc", a node "Nc", and a port attribute "Ac", respectively, for the storage device 310A in an entry 5C and registers a port ID "Pf", a port WWN "Wf", a node "Nf", and a port attribute "Af", respectively, for the storage 310B in an entry 5F. When a connection state is changed after registering the name information, the processing section 210 prepares a request for notifying the storage virtualization switch 20 of change information (RSCN: Registered State Change Notification) and sends the request to each switch.

Next, the processing section 210 prepares a notification request for detailed information of the node (investigation command, etc. such as INQUIRY of an SCSI command) by executing the name server 250 and sends the request to the node registered in the previous step. Each node having received the request notifies the storage virtualization switch 20 of detailed information if it is possible to respond to the request, and the processing section 210 registers the received detailed information in the name table 230 (step 630). For example, the processing section 210 sends a notification request to the host 10A and 10B and the storage devices 310A and 310B, which were registered in the previous step, and receives detailed information from these nodes. Then, the processing section 210 registers detailed information "Host" in the entries 5A and 5D and registers detailed information "Storage" in the entries 5C and 5F.

Here, the administrator of the computer system selects a storage device which the administrator wishes to assign as a virtual storage while keeping the system operating based upon the detailed information to be outputted to the operation terminal 300. Note that virtualization processing may be performed by stopping a storage device which is not used so often. The processing section 210 prepares a virtual storage having the same structure as the storage device selected by the administrator, selects the storage device as a destination of assignment of the virtual storage, and makes it possible to access the virtual storage from the hosts (step 640). Information for preparing the virtual storage is name information and detailed information. Although the processing section 210 prepares a unique WWN anew for a WWN of a virtual port assigned to the virtual storage, it assigns a port ID equivalent to a port ID assigned to the storage device selected by the administrator (processing for assigning an ID equivalent to a port ID of a storage device is hereinafter referred to as misrepresentation processing) (step 650). For example, in the case in which the administrator has assigned the storage device 310A to the virtual storage (the local virtual table 80 in FIG. 1 corresponds to the virtual storage), in order to prepare a virtual storage, the processing section 210 secures the entry 5B for the virtual storage, registers a port ID "Pb", a port WWN "Wb", a node "Nb", and a port attribute "Ab" in the entry 5B, registers "VT" indicating that the storage device is a port processing device having the virtual storage in the virtual information, and registers "Virtual Storage" in the detailed information. Then, the processing section 210 registers "virtual assignment" in the virtual information of the entry 5C corresponding to the storage device 310A. Since the administrator does not assign the storage device 310B to the virtual storage, nothing is registered in the virtual information of the entry 5F. Here, the port ID is registered as "Pb" in the entry 5B. This is equivalent to the port ID of the storage device 310A (port ID in the entry 5C). Thus, the processing section 210 registers "Yes" in the misrepresentation A of the entry 5B and the entry 5C. In addition, since the port processing device 30B is directly connected to the storage device 310A, the processing section 210 sends a communication frame to the storage 310A instead of the hosts (Virtual Host). Thus, the processing section 210 registers name information of the port processing device 30B in the entry 5E, registers "VI" indicating that the storage device is a virtual initiator in the virtual information, and registers "Virtual Host" in the detailed information in the same manner.

Next, the processing section 210 registers information on the prepared virtual storage in the overall virtual table 240 (step 660). The overall virtual table 240 will be described later.

Next, the processing section 210 stores a number of the port processing device, which has received the name information from the switch 500, in the routing table 70 (FIG. 7) associating the number with the port ID of the name information, and registers information indicating that the misrepresentation processing is applied to misrepresentation B of a corresponding entry in the virtual storage which was subjected to the misrepresentation processing (step 670). For example, since the name information of the hosts 10A and 10B is received by the port processing device 30A, the processing section 210 stores a port ID "Pa" and a port processing device number "Ma" in an entry 7A and stores a port ID "Pd" and a port processing device number "Ma" in an entry 7D. Similarly, since the name information of the storage devices 310A and 310B is received by the port processing device 30B, the processing section 210 stores a port ID "Pb" and a port processing device number "Mb" in an entry 7C and stores a port ID "Pf" and a port processing device number "Mb" in an entry 7F. Then, since the port processing device 30A forms the virtual storage of the storage device 310A, the processing section 210 stores a port ID "Pb" and a port processing device number "Ma" in an entry 7B and stores "VT" in the virtual information. The processing section 210 registers "virtual assignment" in the virtual information of the entry 7C because the storage device 310A is assigned as the virtual storage, and registers "Yes" in the misrepresentation B because the misrepresentation processing is performed. In addition, the processing section 210 also makes registration in an entry 7E in the same manner as step 650.

The processing section 210 sends a copy of the routing table 70 to all the port processing devices 30 in the storage virtualization switch, and each port processing device 30 stores the routing table 70 in the memory 60 (step 680).

2. Operations of the Storage Virtualization Switch at the Time When it is Used

Next, operations of the storage virtualization switch 20 at the time when it is used will be described. The operations are roughly divided into a name service and routing including virtual processing.

2.1 Name Service

The name service in the storage virtualization switch 20 means processing concerning name information of a node and is used at the time of virtual processing in the inside of the storage virtualization switch 20, at the time of name inquiry from a node outside the storage virtualization switch 20, and the like.

Figure 6:
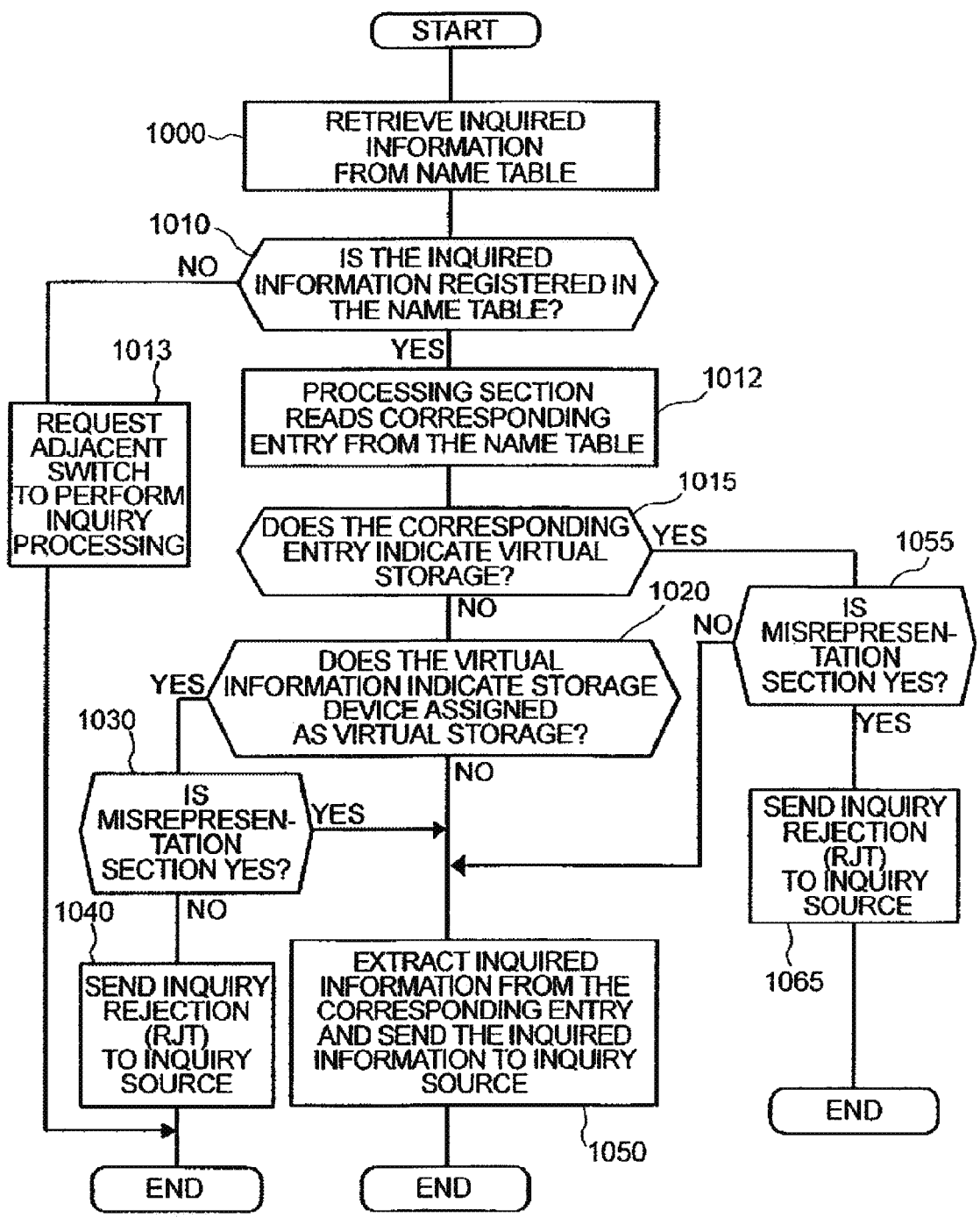
FIG. 6 is a diagram showing a processing flow illustrating procedures for name service operations.

FIG. 6 is a processing flow of the name service. The name service is started with name information inquiry from the host 10 as opportunity.

When the storage virtualization switch 20 receives a name information inquiry request of a certain node A from the host 10 in the port processing device 30, the port processing device 30 sends the inquiry request to the central control unit 200. In the central control unit 200, the processing section 210 analyzes the inquiry request and retrieves inquired information from the name table 230 based upon an analysis result (step 1000).

The processing section 210 judges whether or not the inquired information is registered in the name table 230 based upon a result of the retrieval (step 1010). If the inquired information is registered, the processing section 210 reads a corresponding entry from the name table 230 (step 1012). If the inquired information is not registered, the processing section 210 transfers the inquiry request to an adjacent switch and requests the adjacent switch to perform name inquiry processing (step 1013). If the adjacent switch has the inquired information, the adjacent switch notifies the host 10, which is an inquiry source, of the inquired information. In doing so, the adjacent switch may register the name information of the node concerning the inquired information in the name table 230 of the storage virtualization switch 20. In this case, processing for maintaining consistency of name information between the switches becomes necessary.

Next, the processing section 210 reads virtual information of the entry and checks whether or not the virtual information indicate a virtual storage (step 1015). If the virtual information indicates a virtual storage (represented as "VT" in FIG. 5), the processing section 210 checks whether or not misrepresentation A of the entry indicates misrepresentation (represented as "Yes" in FIG. 5) (step 1055). If the misrepresentation A indicates misrepresentation, the processing section 210 prepares an inquiry rejection (RJT) reply and sends the rejection reply to the host 10 of the inquiry source via the port processing device 30. On the other hand, if the misrepresentation A does not indicate misrepresentation, the processing section 210 performs processing of step 1050 described later.

If the virtual information of the entry does not indicate a virtual storage in step 1015, the processing section 210 checks, based upon the virtual information, whether or not the virtual storage is a storage device assigned as the virtual storage (step 1020). If the virtual storage is a storage device assigned as the virtual storage (represented as "virtual assignment" in FIG. 5), the processing section 210 checks if the misrepresentation A of the entry indicates misrepresentation (step 1030). If the misrepresentation A does not indicate misrepresentation, the processing section 210 prepares an inquiry rejection (RJT) reply and sends the rejection reply to the host 10 of the inquiry source via the port processing device 30.

If the misrepresentation A indicates misrepresentation as a result of step 1030, if the virtual storage is not the storage device assigned as the virtual storage, or if a result of step 1055 is No, the processing section 210 reads the information required by the host 10 from the entry, prepares a reply message, and sends the message to the host 10 via the port processing device 30 (step 1050).

2.2 Routing

The routing in the storage virtualization switch 20 means route control concerning data communication among the plural port processing devices 30. The routing is performed when a communication frame received by the port processing device 30 is sent to the port processing device 30 different from the port processing device 30 which has received the communication frame.

Figure 8:
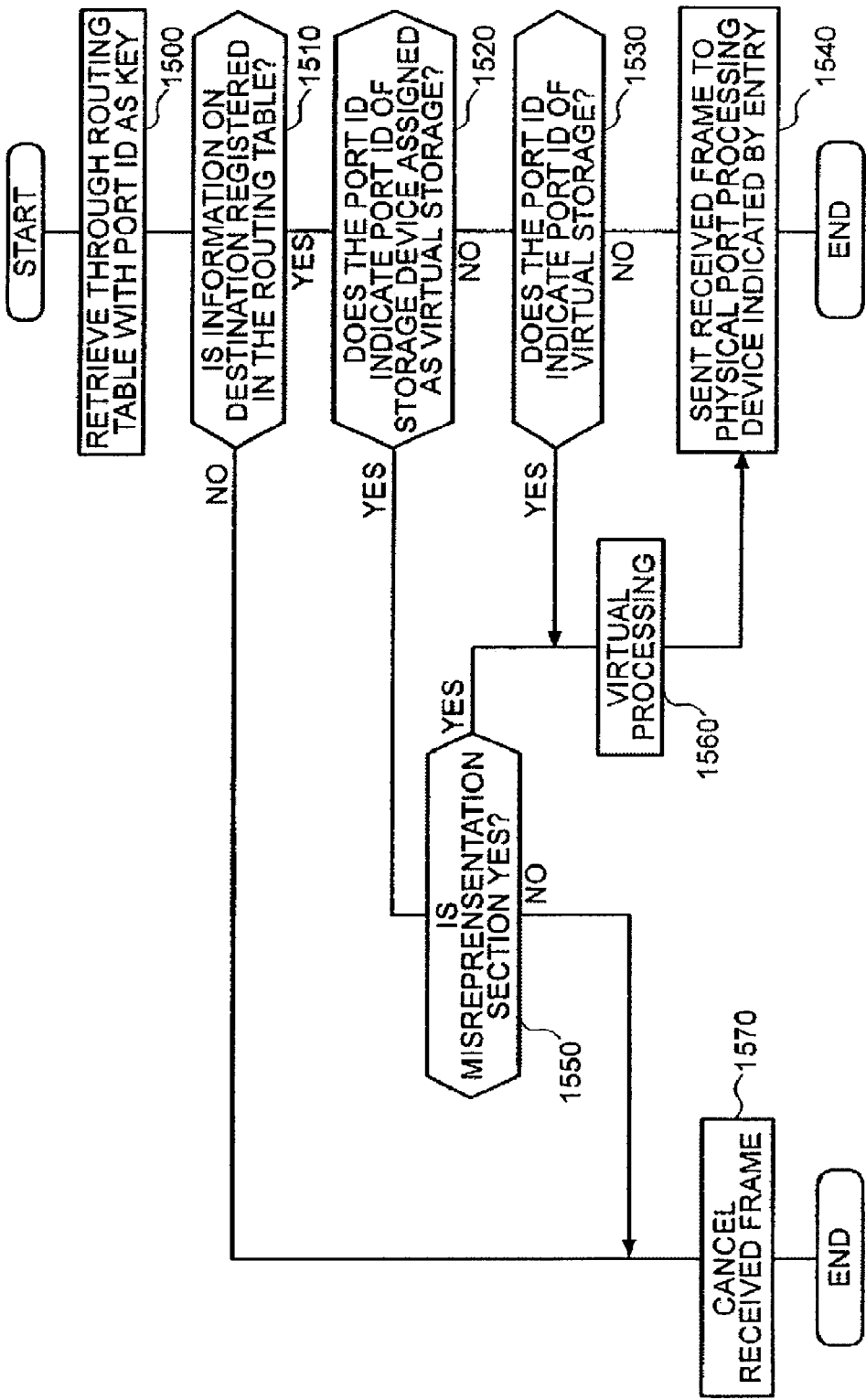
FIG. 8 is a diagram showing a processing flow illustrating procedures for operations of routing.

FIG. 8 shows a processing flow of the routing. The routing is started with reception of a communication frame from a host or a storage device as an opportunity. The communication frame includes a destination port ID, a sending port ID, a type of the communication frame, a sequential number of the communication frame, and the like. In addition, as types of a frame, there are a frame having an command descriptor block (CDB) of SCSI, a reply frame for a memory device, a writing permission reply frame from a memory device, and the like. Here, the case in which the storage virtualization switch has received a communication frame from the host 10 will be described.

When the storage virtualization switch 20 receives a communication frame from the host 10, the processing section 40 in the port processing device 30 analyzes the communication frame. With a sending port ID of the communication frame obtained as a result of the analysis as a key, the processing section 40 retrieves an entry having a port ID coinciding with the destination port ID from the routing table 70 (step 1500), and checks whether or not information of a destination is registered in the routing table (step 1510). If an entry having a port ID coinciding with the destination port ID of the communication frame is not registered, the processing section 40 cancels the communication frame (step 1570). If an entry having a port ID coinciding with the destination port ID of the communication frame is registered, the processing section 40 reads the entry from the routing table and checks whether or not the storage device is the storage device assigned as the virtual storage (step 1520). If the storage device is the assigned storage device (represented as "virtual assignment" in FIG. 7), the processing section 40 checks whether or not the misrepresentation B of the entry indicates misrepresentation (step 1550). If the misrepresentation B does not indicate misrepresentation, the processing section 40 cancels the communication frame (step 1570). On the other hand, if the misrepresentation B indicates misrepresentation, or if a result of step 1520 shows the storage device is not the storage device assigned as the virtual storage but the virtual information of the entry indicates the virtual storage (Yes in step 1530; represented as "VT" in FIG. 6), the processing section 40 performs virtual processing described later (step 1560). After the virtual processing, or if the virtual information of the entry does not indicate the virtual storage, the processing section sends the communication frame to the port processing device 30 indicated by the port processing device number of the entry. The port processing device 30 having received the communication frame sends the communication frame to an external node or the adjacent switch via the switch 100.

2.2.1 Virtual Processing

First, a virtual table which is used in virtual processing (step 1560 of FIG. 8) will be described. As the virtual tables, there are an overall virtual table 240 and a local virtual table 80. The overall virtual table 240 is stored in the memory 220 of the central control unit 200, and includes all information of the virtual processing of a storage virtualization switch. The local virtual table 80 is stored in the memory 60 of the port processing device 30 and stores information on the virtual processing carried out by the port processing device 30 in a subset of the overall virtual table 240. Therefore, structures of the overall virtual table 240 and the local virtual table 80 are identical but the numbers of elements thereof are different.

Figure 9:
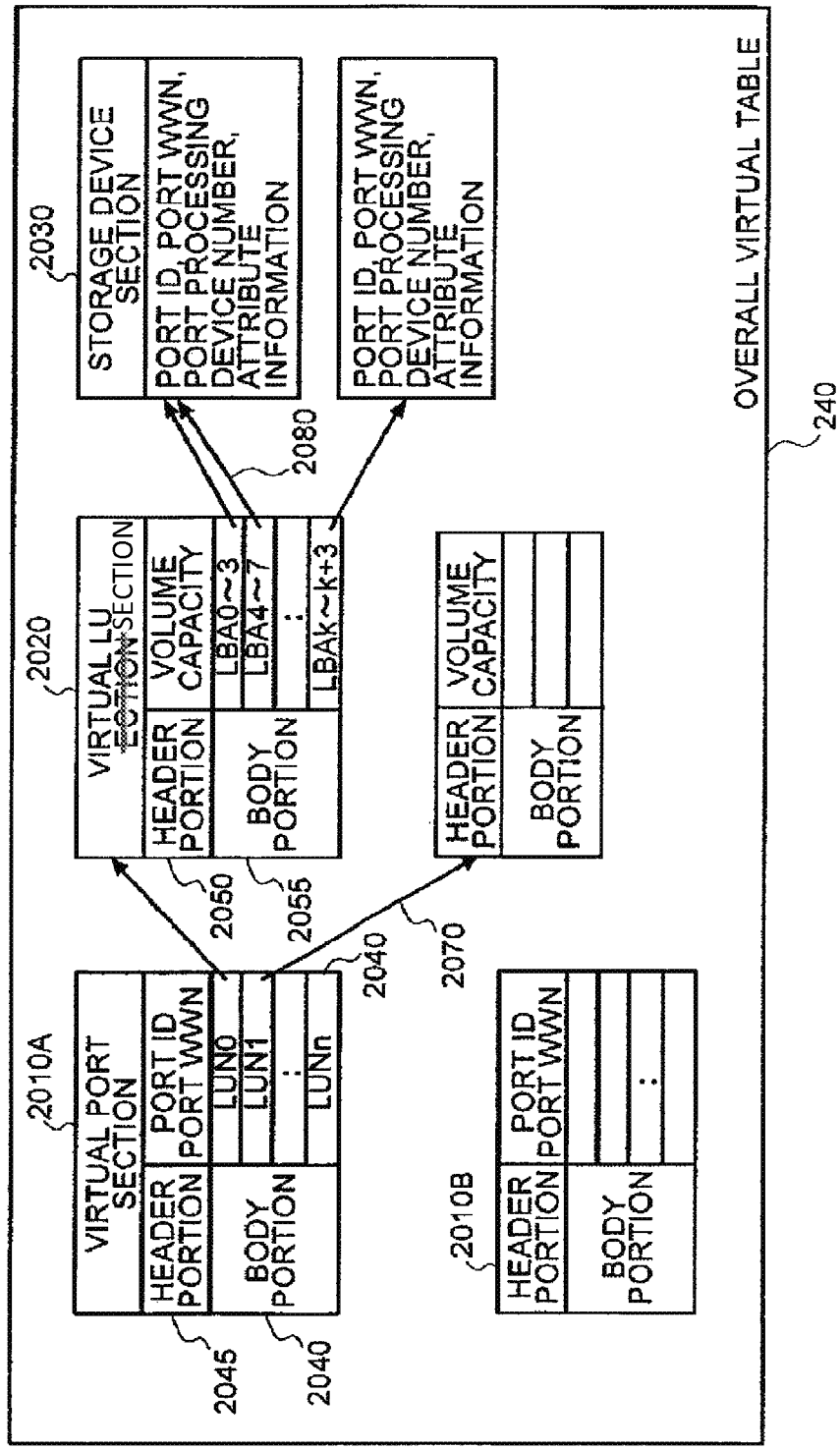
FIG. 9 is a diagram showing an overall virtual table which is used at the time of virtual processing.

FIG. 9 is a diagram showing an example of the overall virtual table 240. The overall virtual table 240 is generated by the processing section 210 in the central control unit 200 at the point when the administrator of the computer system assigns a storage device to a virtual storage while keeping a computer system operating via the operation terminal 300, and stored in the memory 220. The overall storage table 240 includes a virtual port section 2010 (2010A, 2010B), a virtual LU section 2020, and a storage device section 2030. Here, the virtual port sections 2010A and 2010B are equivalent to a local virtual table, respectively.

The virtual port section 2010 has a header portion 2045 which stores port information (a port ID and a port WWN) of the virtual storage and a body portion which stores virtual LU information (LUN0 to LUNn) and link information to the virtual LU section 2020. The virtual LU section 2020 is information indicating a structure of a virtual LU, and has a volume of the virtual LU in a header portion 2050 and has mapping information of a logical block address (LBA) and a volume of an actual storage device corresponding to the virtual LU in a body portion 2055. The storage device section 2030 has a port ID, a port WWN, an LUN, a port processing device number indicating an address of a port processing device in a storage virtualization switch, attribute information, and the like of the storage device. Note that, in the figure, in order to indicate a correspondence relation of link information, reference numerals 2070 and 2080 are written.

Next, the virtual processing (step 1560 of FIG. 8) will be described. Here, it is assumed that the port processing device 30A receives a communication frame and performs processing for sending the communication frame to the storage device 310A. First, the processing section 40 in the port processing device 30A retrieves a local virtual table (virtual port section) using a port ID as a key. As a result of the retrieval, if a local virtual table including the port ID does not exist, the processing section 40 sends a request for acquiring the local virtual table including the port ID to the central control unit 200. The central control unit 200 reads the local virtual table in the overall virtual table and sends it to the port processing device 30A.

The port processing device 30A converts the received communication frame based upon an information section of the corresponding local virtual table (local virtual table received from the central control unit 200 in the case in which the acquisition request is sent to the central control unit 200). That is, the port processing device 30A converts an port ID of the storage device 310A into a destination port ID, converts a port ID of the port processing device 30B (virtual initiator) into a sending port ID, and further performs LBA conversion based upon the mapping information of the virtual LU section. Thereafter, the port processing device 30A sends the communication frame to the port processing device 30B.

2.3 Update of the Name Table and the Routing Table

It is required to irregularly update the name table 230 and the routing table 70 when the storage virtualization switch 20 is used. Thus, an updating operation of the tables will be described.

Update of these tables is carried out when a structure in the computer system has been changed or when interference has occurred. Occurrence of the event is detected by the storage virtualization switch 20 or the switch 500. The storage virtualization switch 20 can detect the occurrence of the event with the RSCN not only in the case in which the storage virtualization switch 20 has detected the event independently but also in the case in which the external switch 500 has detected the event. In the storage virtualization switch 20, the occurrence of the event is notified to the central control unit 200. The processing section 210 in the central control unit 200 analyzes the notified information and checks whether or not the event affects information of the node by comparing an entry of the name table 230 and the notified contents. If the event does not affect the information of the node as a result of checking the name table 230, the processing section 210 cancels the notice, and the storage virtualization switch 20 returns to a standby state. If the event affects the information of the node, the processing section 210 applies change of the information of the corresponding node (e.g., disappearance of the host 10 due to power cutoff, etc.) to the name table 230. In the case of deleting an entry in which the misrepresentation A is Yes, in order to reduce procedures of the administrator at the time when the node is restored, invalidation of the entry may be carried out rather than simply deleting the entry.

Next, the processing section 210 also carries out update of the routing table 70. The processing section 210 carries out this update for the routing table 70 in the central control unit 200 and sends a copy of the routing table 70 to each port processing device 30. Each port processing device 30 stores the copy in the memory 60 in the port processing device 30. In the case in which there is a change in the storage device 310 assigned to the virtual storage, the processing section 210 notifies the operation terminal 300 of the change to request the administrator of the computer system to cope with the change.

The present invention can also be applied to a memory device system provided with a switch function. Here, the switch function means a function provided with a switch in a memory device system and performs as if the physical storage device is directly connected to the host.

Figure 10:
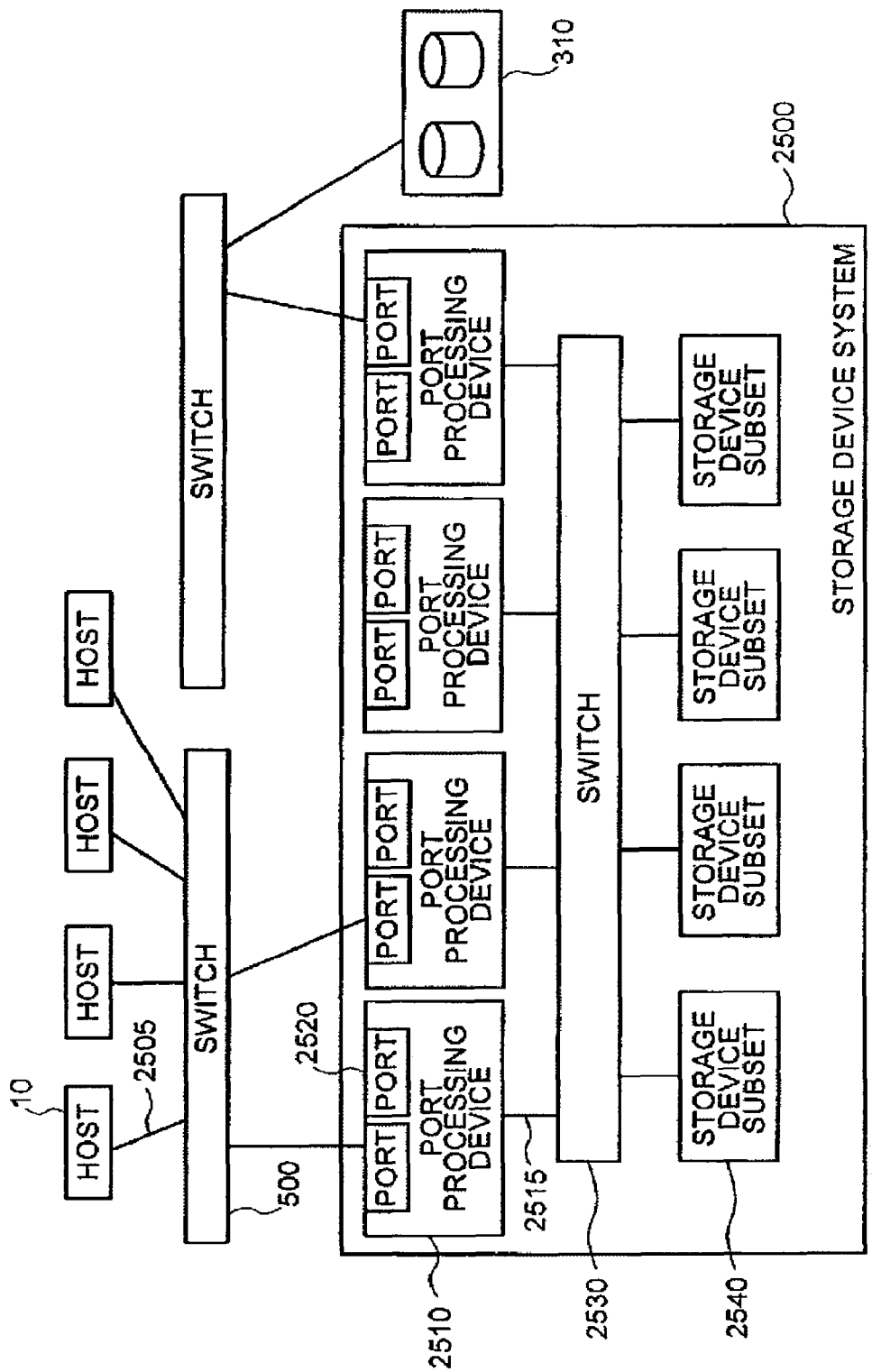
FIG. 10 is a diagram showing an example of a structure of a computer system including a memory device system.

FIG. 10 shows an example of a computer system having a memory device system 2500 and one or more hosts 10. The hosts 10 and a physical storage 310 are connected to the memory device system 2500 via switches 500. The memory device system 2500 has port processing devices 2510 which send and receive data to and from an external node, memory device subsets 2540 which has a memory device storing data and a memory control device controlling the memory device, and a switch 2530 which performs route control between the port processing devices 2510 and the memory device subsets 2540.

In the case in which it is desired to install a memory device system in an existing SAN without stopping a computer system, the present invention is used. In the memory device system, the name service described in the present invention is carried out by the switch 2530, and the routing and the virtual processing are carried out by each port processing device 2510.

According to the present invention, a storage virtualization switch, which can be installed in a computer system, can be provided. In addition, a storage virtualization switch which, when the installed storage virtualization switch assigns an existing storage device as a virtual storage, makes it possible to access a virtual storage from a host while keeping the system operating.

What is claimed is:

1. A computer system comprising:
   a storage device having a real volume on which data is stored; and
   a first switch that is connected to a host computer via a second switch, the first switch also connected to the storage device via a third switch,
   wherein the storage device includes:
   the real volume being associated with a virtual volume of a virtual storage configured in the first switch and provided to the host computer; and
   a port used by the host computer to access the real volume via the first switch,
   wherein the first switch includes:
   a plurality of port processors for sending/receiving data;
   a memory having a program stored therein; and
   a processing module for executing the program,
   wherein the memory stores: a port ID of the storage device; first information indicating whether or not the storage device has a port ID that is equivalent to a port ID of the virtual storage corresponding to the storage device; and second information indicating one or more attributes of a virtual process, the first and second information being associated with each other,
   wherein the program includes: a first process, when receiving an inquiry request concerning the storage device from the host computer, that judges whether or not the inquiry request is for the virtual storage based on the second information; a second process which, if the inquiry request is for the virtual storage, judges whether or not the port ID of the virtual storage is equivalent to the port ID of the storage device corresponding to the virtual storage based on the first information; and a third process which, if the port IDs are equivalent, sends an inquiry rejection to the host computer.

2. The computer system of claim 1, wherein a first port processor among the plurality of port processors is connected to the second switch and wherein a second port processor among the plurality of port processors is connected to the third switch.

3. The computer system of claim 2, further comprising an intermediate switch connected to the first port processor and the second port processor, data between the first port processor and the second port processor being exchanged via the intermediate switch.

4. The computer system of claim 1, further comprising an intermediate switch to which the port processors are connected for transmitting data among the port processors.

5. The computer system of claim 4, wherein each of the port processors is connected to the processing module.

6. The computer system of claim 1, further comprising a terminal for communication between an administrator the first switch.

7. The computer system of claim 1, wherein the program further includes a process that responds to reception of and processing of input information from a user that identifies a storage device that is to be assigned as a virtual storage by storing the first and second information associated with the storage device and the virtual storage without disrupting operation of the computer system.

8. The computer system of claim 1, wherein the program further includes a process that responds to reception of a data packet that includes a destination identifier and a source identifier, wherein the first information and the second information are used to determine a port ID of a storage device that corresponds to the destination identifier.

9. The computer system of claim 1, wherein the inquiry request is name information inquiry.

* * * * *